United States Patent [19]
Umetsu et al.

[11] Patent Number: 5,408,170
[45] Date of Patent: Apr. 18, 1995

[54] DEVICE FOR CHARGING A SECONDARY BATTERY HAVING INTERRUPT MEANS TO PREVENT OVERCHARGING

[75] Inventors: Koji Umetsu; Masayoshi Sasaki; Syojiro Sato, all of Miyagi, Japan

[73] Assignee: Sony Corporation, Japan

[21] Appl. No.: 76,765

[22] Filed: Jun. 15, 1993

[30] Foreign Application Priority Data

Jun. 23, 1992 [JP] Japan .................... 4-188774

[51] Int. Cl.⁶ ............................................. H02J 7/04
[52] U.S. Cl. ........................................ 320/39; 320/22; 320/40
[58] Field of Search ................ 320/20, 21, 22, 23, 320/29, 30, 32, 39, 40

[56] References Cited

U.S. PATENT DOCUMENTS

| 4,354,148 | 10/1982 | Tada et al. | 320/20 |
| 5,175,485 | 12/1992 | Joo | 320/32 |
| 5,179,335 | 1/1993 | Nor | 320/21 |
| 5,237,259 | 8/1993 | Sanpei | 320/23 |
| 5,277,712 | 7/1993 | Boman | 320/21 |

FOREIGN PATENT DOCUMENTS 1194828 8/1989 Japan .
382343 4/1991 Japan .

Primary Examiner—Steven L. Stephan
Assistant Examiner—Robert Nappi
Attorney, Agent, or Firm—Ronald P. Kananen

[57] ABSTRACT

A charging equipment for charging a secondary battery in a constant-current and constant-voltage mode, including a switching device for interrupting a charging current from flowing into the secondary battery at a predetermined period, a charging control device for controlling the operation of the switching device to control the charging, and a voltage detection device for detecting a voltage at a position near to the switching device (e.g., at the input or output side of the switching device) before the charging current is interrupted and a voltage between the switching device and the secondary battery after the charging current is interrupted, thereby calculating a voltage difference between the voltages, the charging control device controlling the operation of the switching device on the basis of the voltage difference of the voltage detection device.

11 Claims, 17 Drawing Sheets

DEVICE FOR CHARGING A SECONDARY BATTERY HAVING INTERRUPT MEANS TO PREVENT OVERCHARGING

BACKGROUND OF THE INVENTION

1. Field of the Invention

This invention relates to charging equipment for charging a secondary battery such as a lead battery.

2. Description of Related Art

In a case where a secondary battery such as a lead battery is charged using this type of charging equipment (hereafter, a compact type of charging equipment is particularly referred to as "charger"), a constant-voltage and constant-current charging operation as shown in FIGS. 1 and 3 has been generally carried out. FIG. 1 shows the relationship between a charging current and an output voltage (an output characteristic of a charger) in such a charging equipment, and a desired charging is carried out by properly using a constant-voltage region and a constant-current region. FIG. 2 shows the relationship (charging characteristic curve) between charging voltage/current and a charging time, and the charging of this case is also carried out by properly using a constant-voltage region and a constant-current region.

As this type of charging equipment for performing the charging in the manner as described above has been known a charging equipment as disclosed in Japanese Laid-open Patent Application No. 3-82343, for example. In this charging equipment, an over-charging state of a secondary battery is detected and a charging current is interrupted or switched to a low-level charging current. Through this operation, the over-charging of the secondary battery is prevented, and life-time, safety, etc. of the secondary battery can be assured.

Another type of conventional charging equipment which is disclosed in Japanese Laid-open Patent Application No. 1-194828 has been also known. In this charging equipment, a battery (secondary battery) is rapidly charged in accordance with a feedback signal from an internal resistance free electrochemical potential.

In any charging equipment, detection of termination (completion) of a charging is required for performing the charging. For example, the following two methods have been adopted as charging-termination detecting methods.

(I) A method for beforehand setting a charging time by a timer and detecting the termination of the charging on the basis of the elapsed charging time.

In this method, as shown in FIG. 3A, the charging time is beforehand set by the timer, and when the set time comes, the charging to a secondary battery is terminated irrespective of its residual charge capacity (insufficient charge capacity) on the basis of the judgment that the predetermined charging time elapses.

(II) A method for detecting a predetermined voltage or current value, and terminating the charging on the basis of the detected voltage or current value.

In this method, as shown in FIG. 3B, when the charging voltage or current reaches a predetermined value, the charging is terminated on the basis of the judgment that a secondary battery is fully charged.

However, the former method (I) has a problem that the charging to a battery which has been already fully charged can not be terminated unless a predetermined time elapses, and thus there occurs dispersion in charge capacity. In addition, this method (I) has also a problem that the timer setting is required to be altered, for example when a high-capacity battery having plural batteries (for example, two batteries) arranged in parallel is used, and this work is cumbersome.

On the other hand, the latter method (II) requires the set voltage or current value to be adjusted with high accuracy. Therefore, this method has a problem that a circuit construction is complicated and a cost is heightened. In addition, a voltage drop of the charging current occurs due to variation in internal impedance of a battery or by a contact resistance between a battery terminal and a charger, so that dispersion in charge capacity occurs due to difference in contact resistance between batteries which have been already charged.

SUMMARY OF THE INVENTION

An object of this invention is to provide a charging device which is capable of easily detecting termination of a charging with high accuracy and can be designed in a simple circuit construction and at a low cost, and in which no dispersion occurs in charging capacity.

In order to attain the above object, according to this invention, a charging equipment to which a secondary battery is loaded, includes output control means for controlling a charging operation such that a constant-current charging is carried out for a voltage below a predetermined voltage and a constant-voltage charging is carried out for a voltage above the predetermined voltage, switching means for interrupting a charging current from flowing into the secondary battery at a predetermined period, charging control means for controlling the operation of the switching means to control the charging, voltage detection means for detecting a voltage at a position near to the switching means (e.g., at the input or output side of the switching means) before the charging current is interrupted and a voltage between the switching means and the secondary battery after the charging current is interrupted, the charging control means controlling the operation of the switching means on the basis of an output of the voltage detection means.

The charging control means preferably includes comparison means for comparing a reference value and a voltage difference between the voltage at the position near to the switching means before the charging current is interrupted and the voltage between the switching means and the secondary battery after the charging current is interrupted, thereby controlling the charging on the basis of a comparison result of the comparison means.

The charging control means includes an alternative-current/direct-current converter and a digital calculator.

The voltage detection means includes selection switch means and a voltage detection circuit. The selection switch means selectively connects the input side of the voltage detection circuit to one of the output side of a charging current supply source and the input side of the secondary battery, and connects the input side of the voltage detection circuit to the output side of the charging current supply source to thereby perform a detection operation.

A power source terminal for driving an electronic equipment is provided at the output side of the charging current supply source.

Reverse-current flow preventing means is provided between the switching means and a contact point of a charging current supply path to which the power source terminal for driving the electronic equipment is connected, to prevent the current flow from the secondary battery side to the electronic equipment side.

According to the charging equipment of this invention, the voltage at the position near to the switching means before the charging current is interrupted and the voltage between the switching means and the secondary battery after the charging current is interrupted are detected, and a fully-charged state of the secondary battery is judged by detecting a state where the voltage difference between the above voltages is below a set voltage. On the basis of the judgment of the fully-charged state, the charging is finished. In this case, a charging current is reduced as a battery voltage approaches to an output set voltage of the charging equipment during a constant-voltage charging period, and thus the voltage difference is also reduced.

The detection of the voltage difference is equivalent to a measurement of an open-circuit voltage of the battery, and thus by detecting the relationship that a constant terminal voltage equals charging capacity, the charging can be properly finished. Therefore, the detection of the termination of the charging can be facilitated, and the accuracy of the detection can be improved. In addition, a charging operation can be easily performed, and no dispersion occurs in charging capacity between charged batteries irrespective of the difference in internal resistance.

Further, since the detection of the voltage difference is made through comparison between relative values, a reference voltage which is necessary to detect an absolute value is not required, and an absolute-value dispersion adjustment (off-set adjustment for an operational amplifier, reference voltage adjustment for an A/D converter, etc.) when the voltage detection circuit is used is not required. As a result, the circuit construction can be simplified and miniaturized, and the cost can be lowered.

DETAILED DESCRIPTION OF PREFERRED EMBODIMENTS

Preferred embodiments according to this invention will be described hereunder with reference to the accompanying drawings.

First Embodiment

Figure 4:
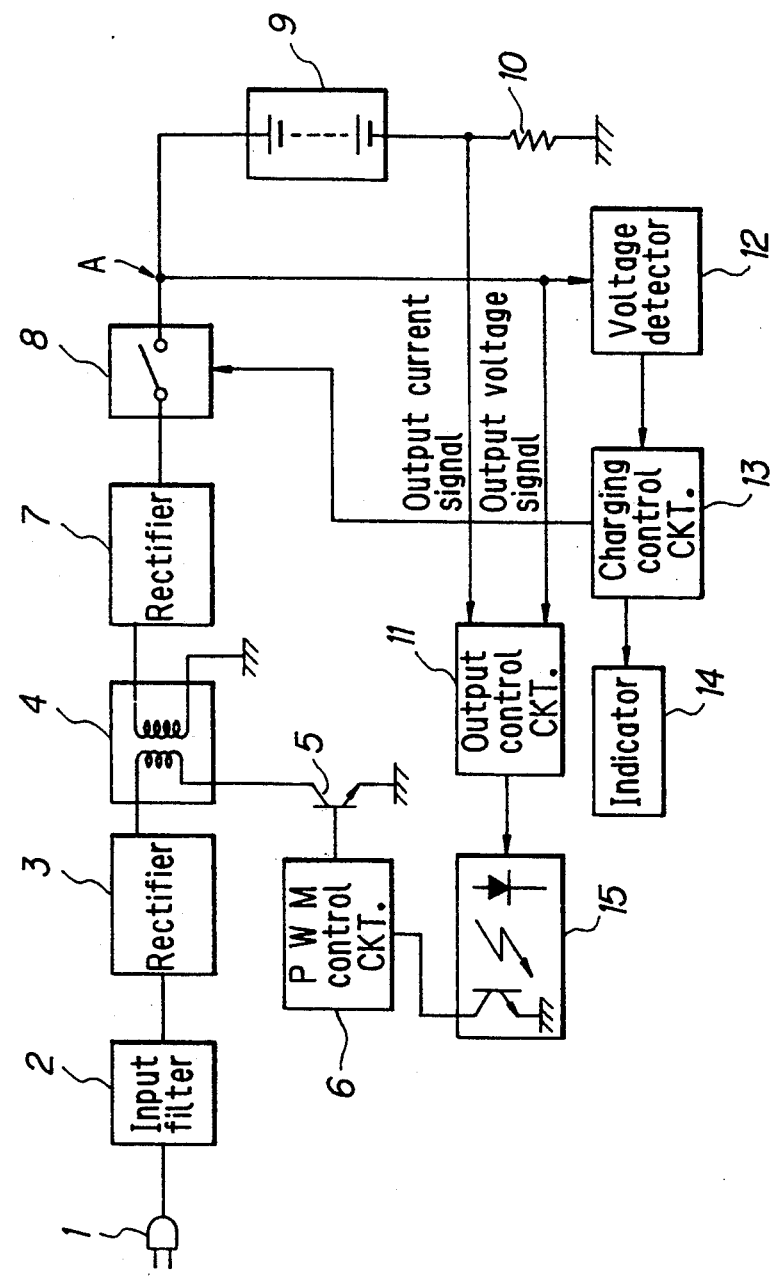
FIG. 4 is a block diagram of a first embodiment of a charging equipment according to this invention.

FIG. 4 is a block diagram of a first embodiment of charging equipment according to this invention, and shows charging equipment using a so-called fly-back converter system. In FIG. 4, a reference numeral 1 represents an AC connector—which is connected to an alternating power source (for example, AC 100 V). An alternating power (AC input) from the AC connector 1 is supplied through an input filter 2 to a rectifying and smoothing circuit 3, in which the input alternating power is rectified (for example, pulsated) and smoothed. Thereafter, the output of the rectifying and smoothing circuit 3 is supplied to a primary side of a transformer 4 which is subjected to a switching operation by a power MOS-FET 5.

The power MOS-FET (corresponding to an active element) 5 is driven by supplying a gate thereof with a PWM pulse from a PWM (Pulse Width Modulation) control circuit 6, and carries out its switching operation. Through this switching operation, the output of a secondary side of the transformer 4 is controlled.

The transducer 4 generates a predetermined output voltage at the secondary side through the switching operation of the primary side of the transformer 4 by the power MOS-FET 5, and the output of the secondary side is supplied to a rectifying and smoothing circuit 7 to be rectified and smoothed into a direct current. Thereafter, the direct current thus converted is supplied through a switch portion 8 to a secondary battery 9 such as a lead battery.

A charging current detection resistor 10 is interposed between the negative electrode side of the secondary battery 9 and ground, and the potential at this point (between the negative electrode side of the secondary battery 9 and the resistor 10) is input to an output control circuit 11 as an output current signal. A voltage at the output side of the switch portion 8 (that is, at the positive-electrode side of the secondary battery 9 as represented by A) (hereinafter referred to as "A-point voltage") is input as an output voltage signal to the output control circuit 11 and a battery voltage detection circuit 12.

Figure 5:
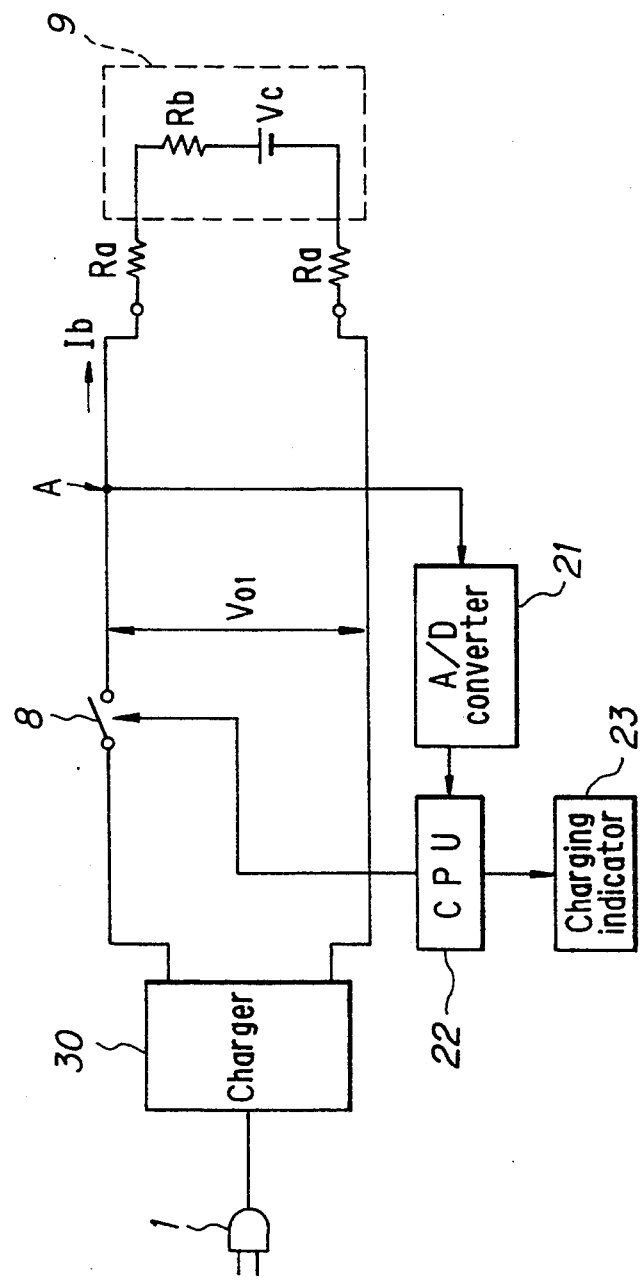
FIG. 5 is a circuit diagram showing the detailed construction of a circuit portion containing a battery voltage detection circuit and a charging control circuit in the first embodiment.

The battery voltage detection circuit (voltage detection means) 12 detects the potential at the positive-electrode side of the secondary battery 9 to judge the termination of the charging, and controls the charging control circuit 13. The detailed construction of the battery voltage detection circuit 12 and the charging control circuit 13 is shown in FIG. 5.

The charging control circuit (charging control means) 13 controls the operation of the switch portion (switching means) 8 in accordance with the charging state of the secondary battery 9. The charging control circuit 13 has an A/D converter and a digital calculator (not shown), and has comparison means for comparing a reference voltage and a voltage difference between a voltage in the neighborhood of the switching portion 8 before the charging current is interrupted (hereinafter referred to as "voltage before interruption") and a voltage between the switching portion 8 and the secondary battery 9 (at the positive-electrode side of the secondary battery 9) after the charting current is interrupted (hereinafter referred to as "voltage after interruption"). The charging control circuit 12 controls the charging on the basis of the comparison result of the comparison means. Specifically, for example, it controls the switch portion 8 to be switched off when the secondary battery 9 is in non-load (non-charging state), and switches the switch portion 8 on and off with pulses of predetermined period to thereby supply a charging current to the secondary battery 9. The charging state of the secondary battery which is controlled by the charging control circuit 13 is displayed on a charging indicator 14.

The output control circuit (output control means) 11 comprises an error amplifier or the like, and compares the rectified and smoothed output voltage and output current at the secondary side of the transducer 4 with respective reference values, and outputs an error output thereof through a photo-coupler circuit 15 to the PWM control circuit 6. Through this operation, the rectified and smoothed output information at the secondary side of the transducer 4 is fed back to the primary side of the transducer 4 to perform the PWM control (current feedback control), so that the charge output characteristic of constant voltage and constant current as shown in FIG. 1 can be obtained.

Figure 1:
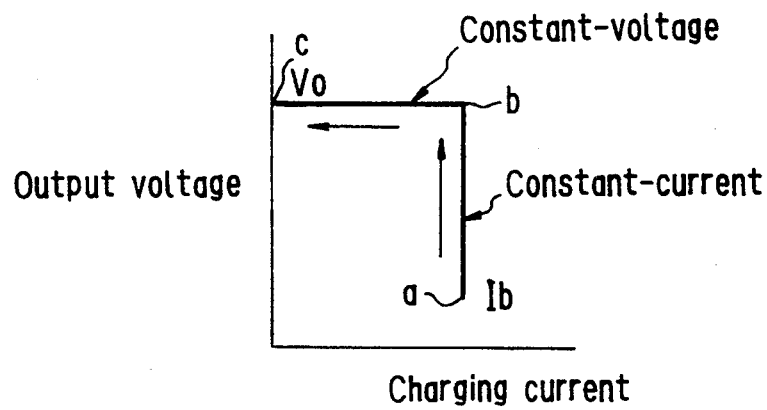
FIG. 1 shows a charging characteristic of a conventional charging equipment.

In the charge output characteristic as shown in FIG. 1, a charging state when a non-charged secondary battery 9 is loaded into a charger corresponds to a point "a" of a constant-current region. This charging state is shifted to a point "b" when the voltage at the battery terminal is increased through charging. Subsequently, the charging current is gradually reduced, and finally the charging state is shifted to a fully-charged state at a point "c".

Figure 3A:
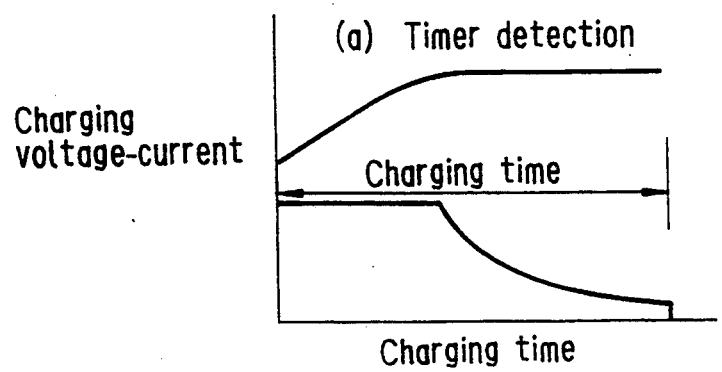
FIGS. 3A and 3B show a charging system of the conventional charging equipment.
Figure 3B:
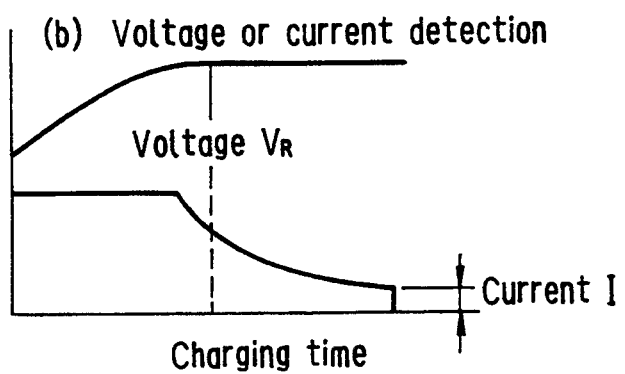

FIG. 5 shows the detailed construction of a circuit portion containing the battery voltage detection circuit 12 and the charging control circuit 13, and it corresponds to the main feature of this invention. This embodiment uses a CPU to control the charging. In FIG. 5, the A-point voltage at the positive-electrode side of the secondary battery 9 is input to an A/D converter 21 to be converted to a digital value, and then output to a CPU (corresponds to a microcomputer containing a memory) 22. The CPU 22 controls the on and off operation of the switch portion 8 at a constant period or arbitrary period in accordance with a program (see FIG. 3 as described later) stored in a memory (not shown) to thereby perform on-off interruption of the charging current. The content of the charging control by the CPU 22 is displayed at the outside by a charging indicator 23.

The secondary battery 9 has an internal voltage Vc, an internal resistance Rb and a contact resistance Ra at each terminal thereof. In FIG. 5, a series of parts for rectifying and smoothing the alternating power input from the AC connector 1 and then generating a charging output at the secondary side of the transducer 4 through the switching operation at the primary side of the transducer 4 by the power MOS-FET 5 are collectively represented by a charger 30 to simplify the description of this embodiment.

DESCRIPTION OF OPERATION

According to the charging equipment thus constructed, when the secondary battery is loaded and AC input is supplied, the on-off operation of the switch portion 8 is controlled by the charging control circuit 13 to supply the charging current to the secondary battery 9, thereby starting the charging operation. In a charging operation, the output voltage and output current at the secondary side are compared with reference values, and an error output of the comparison is output through the photocoupler circuit 15 to the PWM control circuit 6. Through this operation, the rectified and smoothed output information at the secondary side of the transducer 4 is fed back to the primary side of the transducer 4 to perform a current feedback control, whereby the charging to the secondary battery 9 is carried out on the basis of the charging characteristic of constant voltage and constant current.

Figure 6:
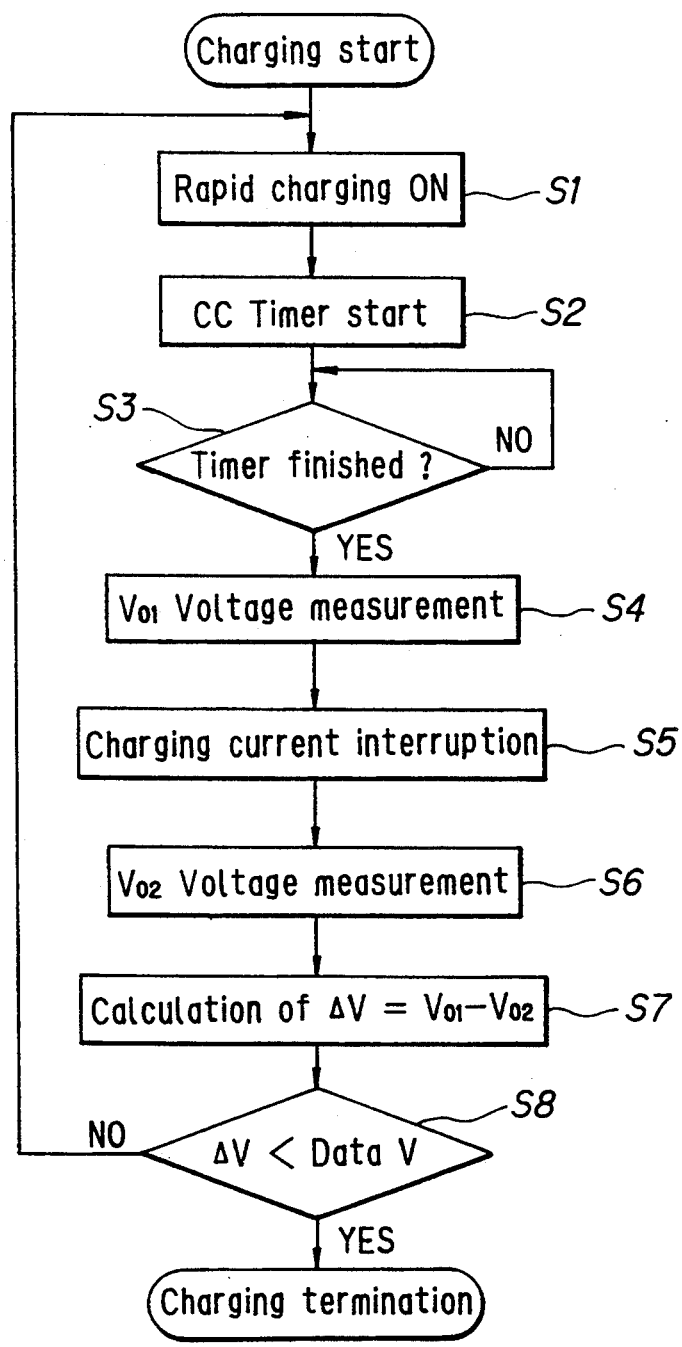
FIG. 6 is a flowchart for a charging control program in the first embodiment.

FIG. 6 is a flowchart for a charging control program which is executed by the CPU 22 when a rapid charging is carried out.

Upon start of the charging, first, the rapid charging is on (started) at a step S1. This operation means that the on-off operation of the switch portion 8 is controlled by the charging control circuit 13 to supply the charging current to the secondary battery 9 and start the charging.

Subsequently, at a S2, a CC timer for counting a charging time is started. Through this step, a lapse time from the start of the charging is counted. Subsequently, at a step S3, the CC timer counts a predetermined time to make a judgment as to whether the count is finished (time-up). If the count is judged not to be finished, the program continues its execution at the step S3. If the count is judged to be finished, the program goes to a step S4.

At a step S4, a voltage $V_{o1}$ before interruption of the charging current is detected. The voltage $V_{o1}$ is the A-point voltage before interruption of the charging current as shown in FIG. 5, and corresponds to a charging output voltage of the charger. Subsequently, the charging current is interrupted at a step S5, and a voltage $V_{o2}$ after interruption of the charging current is detected at a step S6. The voltage $V_{o2}$ is the A-point voltage when the charging current is interrupted.

Subsequently, the voltage difference $\Delta V$ between the voltages before and after interruption of the charging current is calculated in accordance with the following equation at a step S7.

$$\Delta V = V_{o1} - V_{o2}$$

Figure 2:
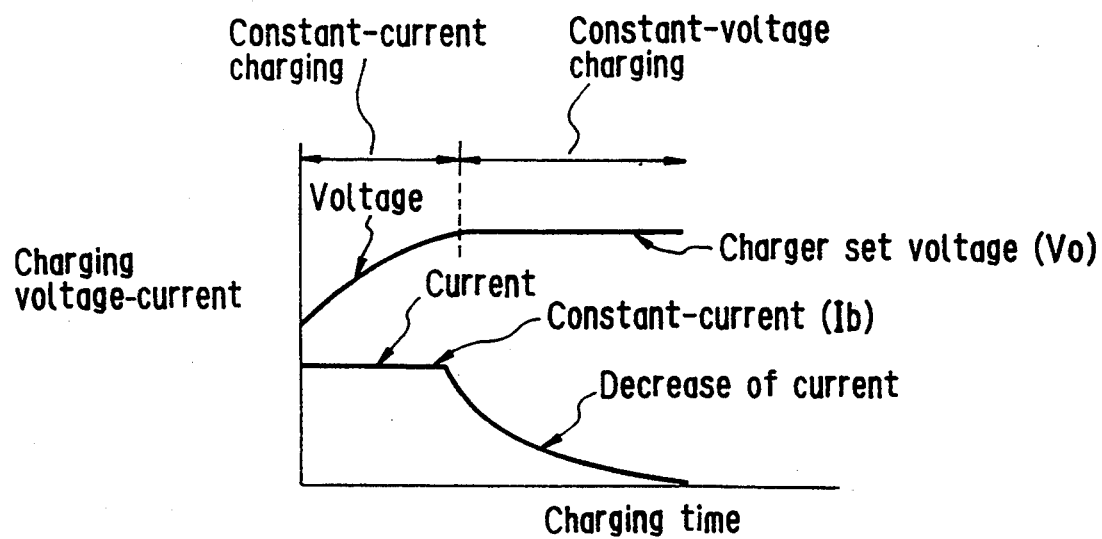
FIG. 2 shows a charging mode of the conventional charging equipment.

Considering the voltage difference during the constant-voltage charging period in the charging curve as shown in FIG. 2, the A-point voltage before interruption of the charging current (the voltage at the battery terminal under charging) is fixed to a constant voltage value irrespective of variation of the charging current because the output voltage of the charger is controlled to be constant during the constant-voltage period. That is, it can be estimated that constant voltage value=reference voltage. Therefore, it can be assumed that $V_{o1}=K$ (fixed voltage value), and thus the above equation can be modified to $\Delta V = K - V_{o2}$.

On the other hand, the voltage $V_{o2}$ after interruption corresponds to an open-circuit voltage of the battery, and thus the measurement of $\Delta V$ corresponds to the measurement of the open-circuit voltage of the battery. Accordingly, the battery open-circuit voltage can be calculated by the equation: $V_{o2}$=battery open-circuit voltage=$K - \Delta V$.

Figure 7:
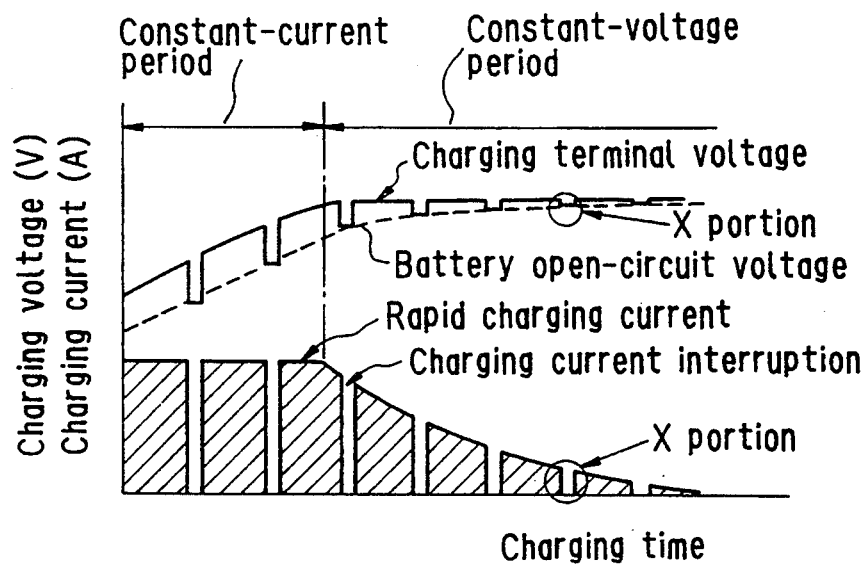
FIG. 7 is a schematic view showing a charging characteristic of the first embodiment.
Figure 8:
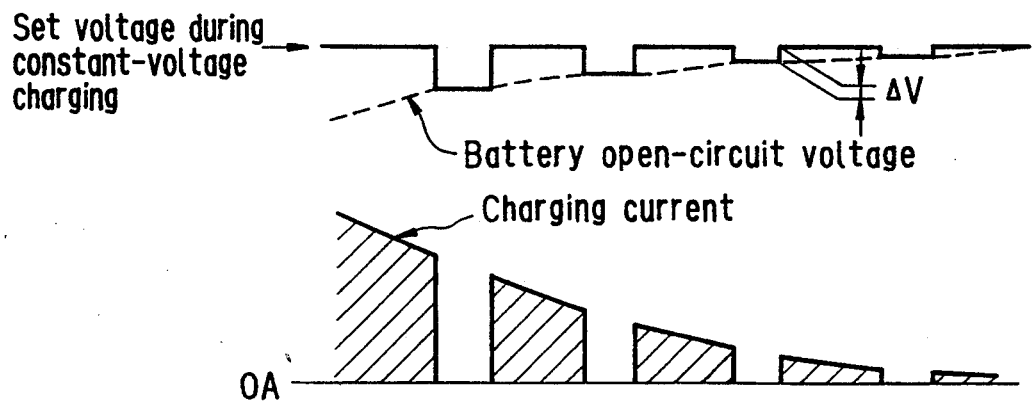
FIG. 8 is a schematic view of an enlarged curve of an X portion of FIG. 7 in the first embodiment.

FIG. 7 shows a charging characteristic curve when the charging current is periodically interrupted. FIG. 8 shows an enlarged curve of an X portion of FIG. 7. As is apparent from these figures, the voltage difference $\Delta V$ which is induced by the interruption of the charging current is reduced as the battery voltage is increased. Therefore, by calculating the voltage difference $\Delta V$ and estimating the battery voltage on the basis of the calculated voltage difference $\Delta$, the termination of the charging can be accurately judged.

Therefore, referring to the program again, the voltage difference $\Delta$ calculated at the step S7 is compared with a predetermined set voltage value (data V) at a step S8 to detect a point satisfying the inequality: the voltage difference $\Delta V <$ data V. If it is not satisfied that the voltage difference $\Delta V <$ data V, the interruption state for the termination of the charging is released, and the program returns to the step S1 to repeat the same processes as described above and resume the charging for a constant period. This period is counted by the timer of the CPU 22, and when the timer finishes its counting, the charging current is interrupted again to measure the voltage difference $\Delta V$ again.

If it is satisfied that the voltage difference $\Delta V <$ data V, it is treated as a charging-termination detection point or as a fully-charging detection indication (for example, it is displayed at the outside by the charging indicator 23), and the charging is finished.

Here, the processing for detecting the battery open-circuit voltage on the basis of the detection of the above voltage difference $\Delta V$ requires a condition that the voltage difference $\Delta V$ is detected and processed during the constant-voltage charging period when the voltage $V_{o1}$ before interruption of the charging current is a constant voltage (invariable). Accordingly, a constant-current charging period when the voltage $V_{o1}$ is varied as shown in FIG. 7 will be next considered.

As shown in FIG. 7, the voltage difference $\Delta V$ of the constant-current charging period has an extremely larger value than the voltage difference $\Delta V$ at the charging-termination detection point during the constant-voltage charging period. This is because the charging current value of the constant-current charging period is larger than the charging current at the charging-termination detection time and thus a voltage drop represented by an equation: $\Delta V = Ib \cdot Rb$ (Ib: charging current, Rb: internal impedance of the battery and a contact resistance between a battery terminal and a charger) occurs.

Therefore, by setting the set voltage value (data V) to be compared with $\Delta V$ to a voltage value lower than the value of $\Delta V$ occurring during the constant-current charging period, the malfunction can be avoided even when the charge-termination detection is carried out the basis of the judgment of the constant-current charging period as to whether the voltage difference $\Delta <$ data V in the same manner as described above.

Next, the reason why the voltage difference $\Delta V$ during the constant-voltage charging period before and after interruption of the charging current is not affected by the internal impedance of the secondary battery 9 and the contact resistance between the battery terminal and the charger will be described.

Combining the internal impedance Rb of the secondary battery 9 and the contact resistances Ra between the battery terminals and the charger and representing the composite resistance by Rc, the following equation is satisfied:

$$Rc = Rb + 2 \cdot Ra$$

The voltage $V_{o1}$ at the battery terminal under charging is represented as follows:

$$V_{o1} = \Delta V + Vc = Ib \cdot Rc + Vc$$

Figure 9:
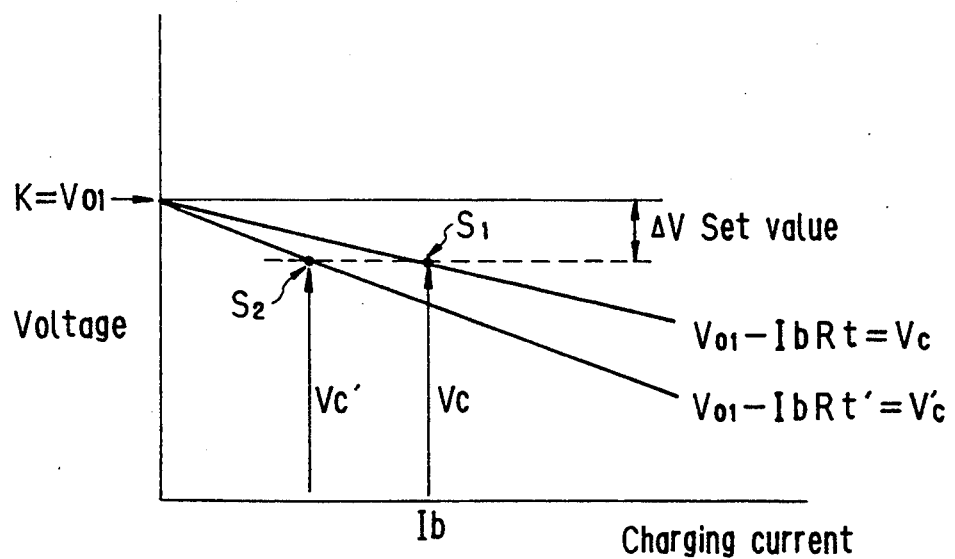
FIG. 9 shows the relationship between a battery terminal voltage and a charging current in the first embodiment.

The relationship between the battery-terminal voltage and the current in this case is shown in FIG. 9. As described above, the battery-terminal voltage $V_{01}$ under charging is a value measured during the constant-voltage control period, and thus it is controlled to be a constant value irrespective of variation of the charging current Ib. Modifying the above equation, the following equations are obtained:

$$Vc = V_{o1} - \Delta V$$

$$Vc = V_{o1} - Ib \cdot Rc$$

$$Vc = K - \Delta V$$

The detection point at this time is an $S_l$ point of FIG. 9.

Likewise, assuming that the composite resistance Rc is greatly varied (increased to Rc'), the following equations are also satisfied:

$$Vc' = V_{o1} - Ib \cdot Rc'$$

$$Vc' = K - \Delta V$$

The detection point at this time is an $S_2$ point. Vc' represents an internal voltage of the battery when the composite resistance RC is greatly varied.

As shown in FIG. 9, only the charging current Ib is varied, and the equation: Vc=Vc' is satisfied. Therefore, it is apparent that $\Delta V$ is detected as an equivoltage.

As described above, even when the internal impedance Rb is varied through alteration of a battery to be connected to the charger or the contact resistance Ra between the battery terminal and the charger is varied, the voltage difference $\Delta V$ detection system of this embodiment can detect the voltage difference $\Delta V$ as an equivoltage value. Further, in a case of a secondary battery having the charging characteristic as shown in FIG. 2, correlation is generally satisfied between the battery open-circuit voltage and the charging amount, so that the detection can be performed with a constant charging amount and the termination of the charging and the full charging can be displayed.

As described above, in this embodiment, even when the internal impedance Rb or the contact resistance Ra between the battery terminal and the charger is varied, the voltage difference ΔV before and after interruption of the charging current are measured (this is equivalent to the measurement of the battery open-circuit voltage), so that the charging can be properly terminated by detecting the relation: constant terminal voltage=-charging amount. Therefore, the detection of the termination of the charging can be easily carried out, and the detection accuracy for the termination of the charging can be improved. As a result, the charging operation can be easily performed, and no dispersion occurs in charging capacity between batteries which have been already charged even when the contact resistances thereof are different.

Further, as shown in the charging curve of FIG. 2, the voltage before interruption of the charging current is fixed to a constant voltage value during the constant-voltage charging period, and the voltage difference between this voltage and the voltage after interruption of the charging current (that is, the battery open-circuit voltage) is detected. Therefore, the detected voltage difference is a relative value, and thus a reference voltage which would be required to detect a voltage of absolute value is not required.

Still further, according to the construction as described above, the charging equipment of this embodiment requires no absolute-value dispersion adjustment (offset adjustment of an operational amplifier, reference-voltage adjustment of an A/D converter, etc.) which is required when a voltage detection circuit is used. As a result, the circuit construction can be simplified and the charging equipment can be designed in a compact size. In addition, the cost of the charging equipment can be reduced.

The embodiment as described above is designed using the microprocessor (CPU), however an operation amplifier or the like may be used for detection of the voltage difference ΔV. Further, according to the voltage difference ΔV detection system of this embodiment, the battery voltage can be constantly detected with high accuracy, so that the charging capacity during the charging operation can be detected.

Second Embodiment

Figure 10:
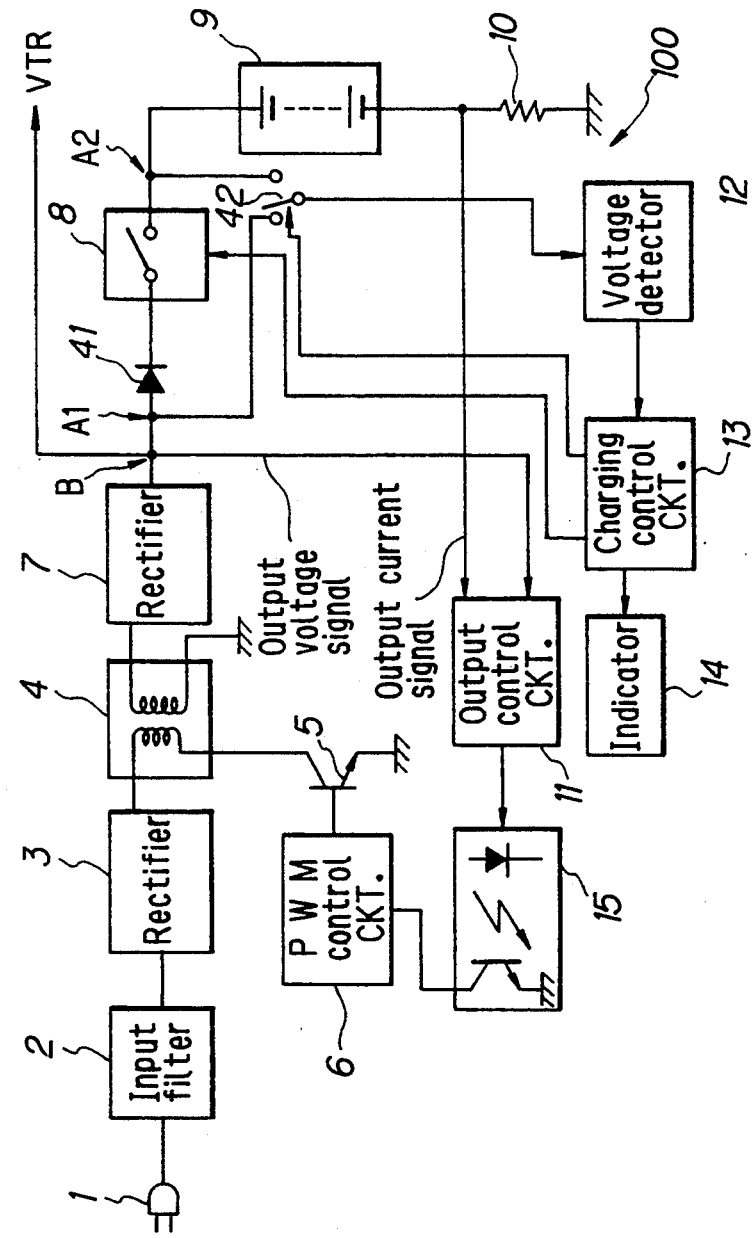
FIG. 10 is a block diagram of a second embodiment of the charging equipment according to this invention.

FIG. 10 is a block diagram of a second embodiment of the charging equipment according to this invention. In the following description, the same elements as the first embodiment will be represented by the same reference numerals, and the duplicate description thereof is eliminated.

In FIG. 10, a reverse-flow preventing diode 41 is interposed between the rectifying and smoothing circuit 7 and the switch portion 8. A reference numeral 42 represents a selection switch, and the selection switch 42 serves to alternately pick up a voltage (hereinafter referred to as "A1-point voltage") at the anode side (input side) of the diode 41 and a voltage (hereinafter referred to as "A2-point voltage") at the output side of the switch portion 8 and output the selected voltage to the voltage detection circuit 12. The selection switch 42 and the voltage detection circuit 12 constitutes voltage detection means 100 in combination.

No problem basically occurs even when a measurement point of the A1-point voltage is not located at the anode side (input side) of the diode 41, but located at the cathode side (output side) of the diode 41. However, the input side voltage of the diode 41 can be detected with higher accuracy when the measurement point is located at the input side.

Figure 11:
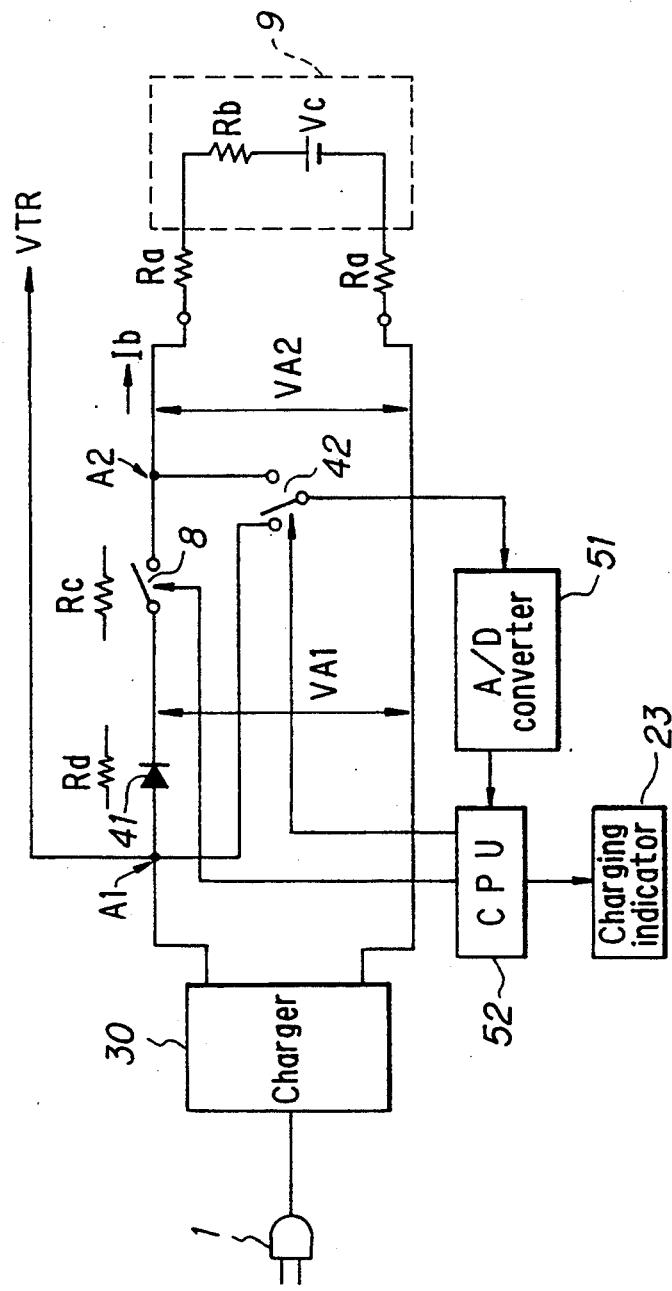
FIG. 11 is a block diagram of the detailed construction of a circuit portion containing a battery voltage detection circuit and a charging control circuit of the second embodiment.

FIG. 11 is a circuit diagram of a detailed construction of a circuit portion containing the battery voltage detection circuit 12 and the charging control circuit 13, and corresponds to the main feature of this embodiment. In this embodiment, the CPU is also used. In FIG. 11, the voltage (that is, A1-point voltage) at the input side of the diode 41 or the switch portion 8 and the voltage (A2-point voltage) at the output side of the switch portion 8 are alternately switched by the selection switch 42, and alternately output to an A/D converter 51. The input voltage is subjected to A/D conversion by the A/D converter 51, and then output to a CPU 52. The CPU 52 carries out the charging control on the basis of the voltage difference between the A1-point voltage and the A2-point voltage.

The diode (reverse-flow preventing means) 41 is provided to prevent current flow from the secondary battery 9, for example, a VTR (corresponding to an electronic equipment (not shown)) to when a power supply for driving the VTR is provided). The primary side of the diode 41 serves as a power source terminal for driving the electronic equipment.

Description of Operation

Figure 12:
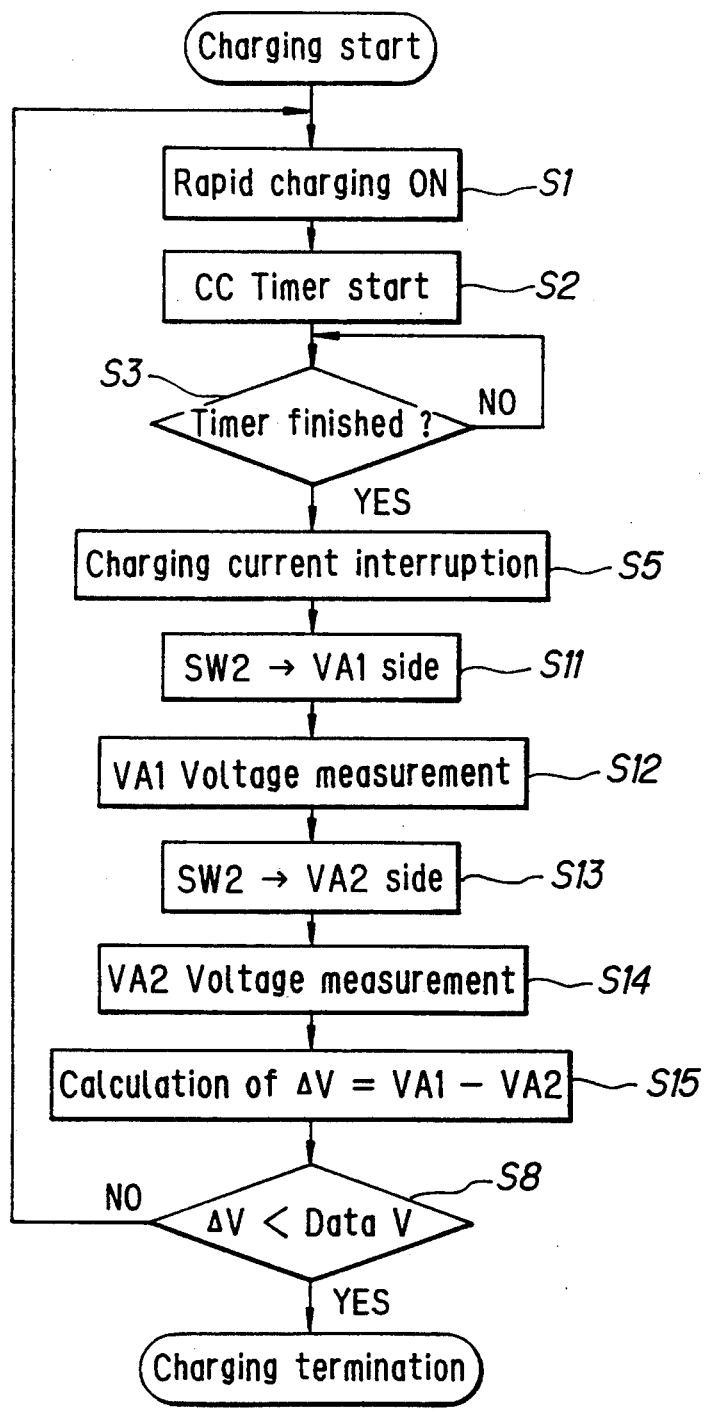
FIG. 12 is a flowchart for a charging control program in the second embodiment.

FIG. 12 is a flowchart for a charging control program which is executed by the CPU 52 to perform a rapid charging.

In the following description of the flowchart, the same steps for performing the same processes as the first embodiment are represented by the same reference numerals, and the duplicate description thereof is eliminated.

The processes from the step S1 to the step S3 are identical to the first embodiment. Subsequently, at the step S5 the charging current is interrupted, and at a step S11 the selection switch 42 (which is merely represented by SW2 in the flowchart) is switched to the input side of the switch portion 8 to measure an A1-point voltage VA1 at a step S12. The selection switch 42 (that is, sW2) is switched to the output side of the switch portion 8 at a step S13 to measure a A2-point voltage VA2 at a step S14.

Subsequently, at a step S15, the voltage difference ΔV at the input/output sides of the switch portion 8 is calculated in accordance with the following equation:

$$\Delta V = VA1 - VA2$$

Thereafter, the program goes to a step S8 to compare the difference voltage ΔV with the set voltage value (data V) and detect a point satisfying the inequality: voltage difference ΔV < data V. If it is not satisfied that voltage difference ΔV < data V, the interruption state for the termination of the charging is released, and the program returns to the step S1 to repeat the same processes and resume the charging for a predetermined constant period. This period is counted through the timer setting of the CPU 52, and the charging current is interrupted again to measure the voltage difference ΔV as described above at the time when the counting of the timer is finished.

If it is determined that voltage difference ΔV < data V, it is treated as the charging-termination detection point or the full charging detection display (for example, the charging state is displayed at the outside by the full charging indicator 23), and the charging is terminated.

Figure 13:
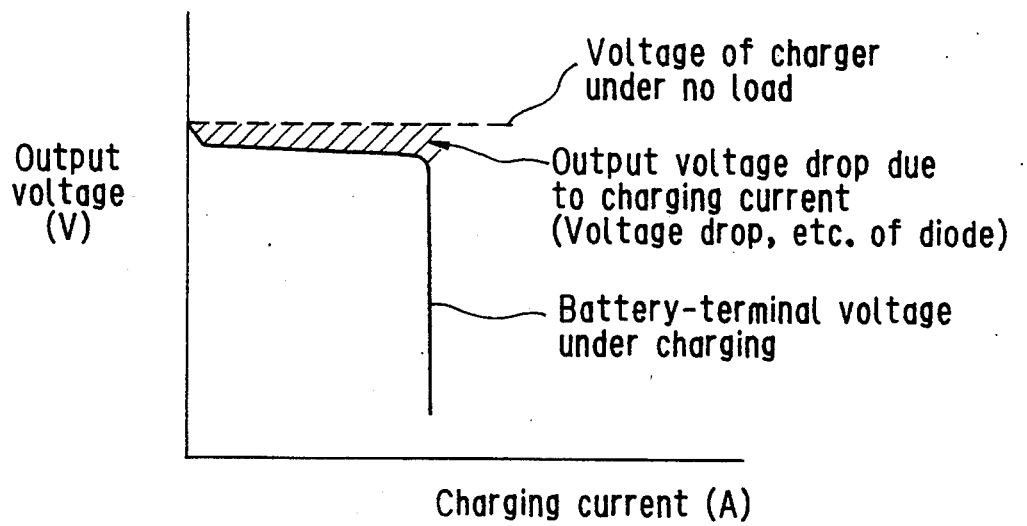
FIG. 13 is a schematic view showing a charge output characteristic in the second embodiment.

Here, the A1-point voltage VA1 during interruption of the charging current corresponds to an output-terminal voltage of the charger on which no load is imposed (hereinafter referred to as "charger under no load"). FIG. 13 shows an output characteristic of this embodiment. In this case, since there is provided the diode 41 for preventing current flow from the battery to a VTR serving as an external load, a voltage drop occurs in accordance with the charging current. The voltage drop is varied in accordance with dispersion of the characteristic and temperature characteristic of the diode 41. However, as described above, the A1-point voltage VA1 during the interruption of the charging current corresponds to the output voltage of the charger under no load, and thus it is fixed to a constant value (invariable value). Therefore, the A1-point voltage VA1 becomes the fixed voltage value=K, and the following modification may be obtained: $\Delta V = K - VA2$.

On the other hand, the measurement of the A2-point voltage VA2 after interruption of the charging current corresponds to the measurement of the open-circuit voltage of the battery, so that the measurement of the voltage difference $\Delta V$ between VA1 and VA2 corresponds to the measurement of the open-circuit voltage of the battery. Therefore, $VA2 = Vc = $ open-circuit voltage of the battery $= K - \Delta V$.

Figure 14:
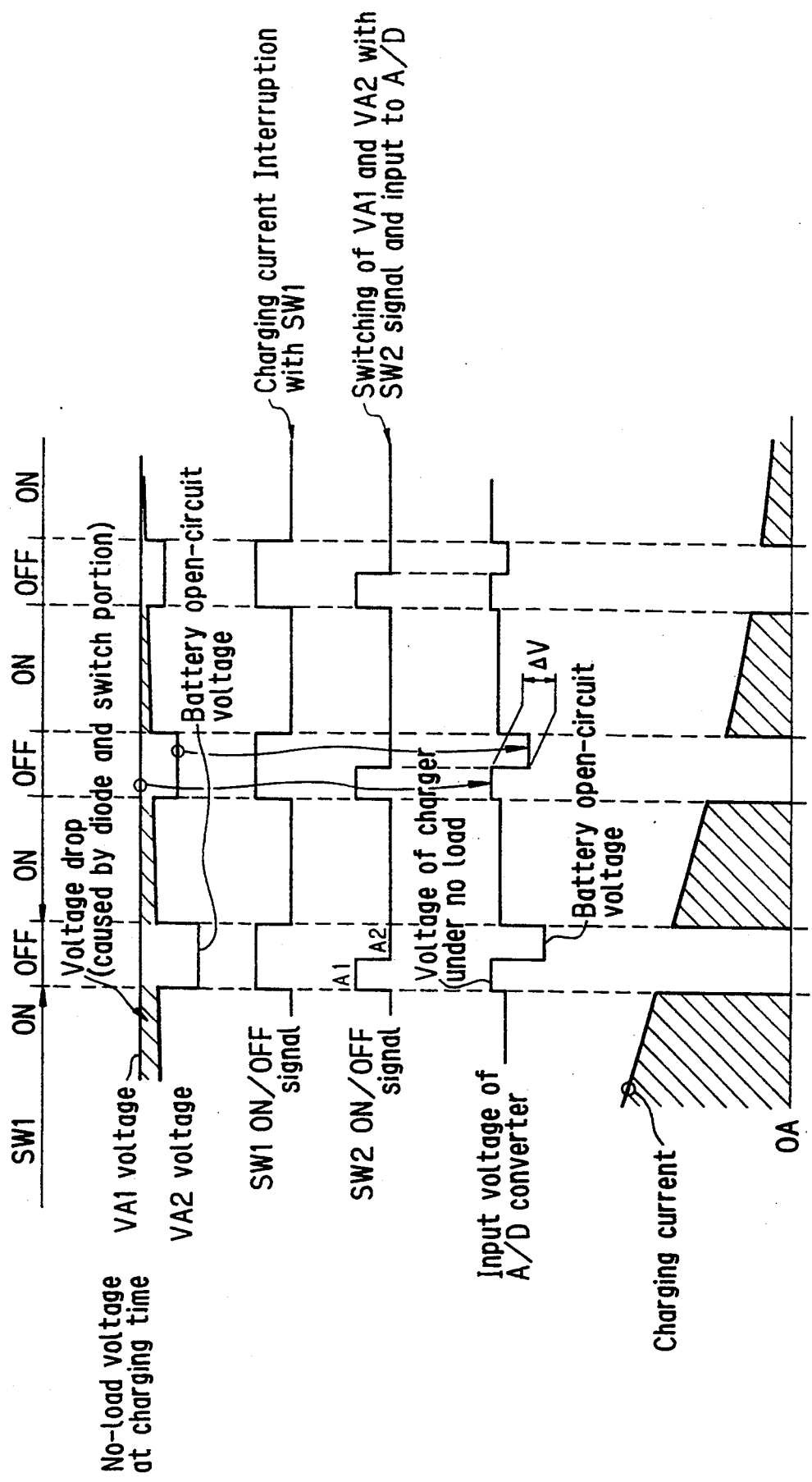
FIG. 14 is a schematic view showing an enlarged curve of the charging characteristic in the second embodiment.

The charging characteristic curve when the charging current is periodically interrupted is similar to that of FIG. 7. FIG. 14 shows an enlarged curve of the X portion of FIG. 7. In FIG. 14, the switch portion 8 is represented by SW1, and the selection switch 42 is represented by SW2 for convenience's sake of description.

As is apparent from this figure, the voltage difference $\Delta V$ during interruption of the charging current is reduced as the voltage of the battery is increased. Accordingly, by calculating the voltage difference $\Delta V$ and estimating the voltage of the battery on the basis of the calculated voltage difference, an accurate judgment as to whether the charging is terminated can be made.

The process for detecting the open-circuit voltage of the battery on the basis of the above voltage difference $\Delta V$ requires a condition that the A1-point voltage VA1 during interruption of the charging current is fixed to a constant voltage. In this case, the A1-point voltage VA1 is equal to the output voltage of the charger under no load during the constant-current charging period and the constant-voltage charging period as shown in FIG. 7 because the charging current is interrupted by the switch portion 8. Therefore, the variation of the battery-terminal voltage during the constant-current charging period can be set to the voltage under no load through the interrupting operation of the switch portion 8, and a stable voltage source can be supplied without voltage variation of the diode 41.

Next, the reason why the output voltage difference $\Delta V$ between the voltages at the input and output sides of the interrupting switch (that is, switch portion 8) when the charging current is interrupted suffers no affection of the internal impedance of the secondary battery, the contact resistances between the battery terminals and the charger, etc. will be described.

Combining the internal impedance Rb of the secondary battery 9, the contact resistances Ra between the battery terminals and the charger, an on-resistance Rc of the switch portion 8 and an on-resistance Rd of the diode 41 as shown in FIG. 11, and representing the composite resistance by Rt, $$Rt = 2 \cdot Ra + Rb + Rc + Rd$$

The battery-terminal voltage VA1 under charging is represented by the following equation:

$$VA1 = \Delta V + Vb = Ib \cdot Rt + Vc$$

$$Vc = VA1 - Ib \cdot Rt$$

Figure 15:
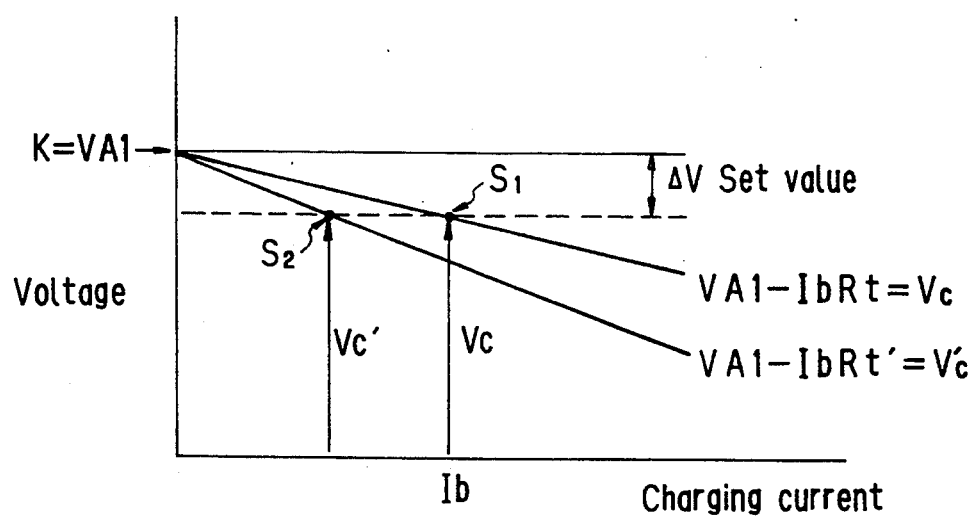
FIG. 15 is a schematic view showing the relationship between the battery terminal voltage and the charging current in the second embodiment.

The relationship between the battery terminal voltage and the charging current at this time is shown in FIG. 15. As described above, the voltage VA1 of the battery terminal during the charging corresponds to the output voltage of the charger under no load, and thus it is controlled to be a fixed value irrespective of variation of the charging current Ib. Therefore, the above equation can be modified as follows:

$$Vc = VA1 - \Delta V$$

$$Vc = K - \Delta V$$

The detection point at this time becomes an S1 point as shown in FIG. 15.

Similarly, considering a case where the value of the above composite resistance Rt is greatly varied (to Rt'), the following equations are also satisfied in this case:

$$Vc' = VA1 - Ib \cdot Rt'$$

$$Vc' = K - \Delta V$$

The detection point at this time becomes an S2 point. Vc' represents an internal voltage of the battery when the composite resistance Rt is greatly varied.

As shown in FIG. 15, only the charging current Ib is varied, and the equation: $Vc = Vc'$ is satisfied, so that the voltage difference $\Delta V$ is detected as an equivoltage.

As described above, even when the internal impedance Rb is varied by altering the battery to be connected to the charger, or dispersion of the contact resistances Ra between the battery terminal and the charger, the on-resistance Rc of the switch portion 8 for current interruption and the on-voltage of the diode 41, etc. are varied, the voltage difference $\Delta V$ detection system of this embodiment can detect the voltage difference $\Delta V$ as an equivoltage value of the open-circuit of the battery.

Further, in a case of a secondary battery having the charging characteristic as shown in FIG. 2, correlation is generally satisfied for the relationship between the open-circuit voltage of the battery and the charging amount. Therefore, the detection can be carried out with a constant charging amount, and thus the termination of the charging and the full-charge indication can be performed.

As described above, in the second embodiment, even when the internal impedance Rb of the secondary battery, the contact resistance Ra between the battery terminal and the charger, the on-resistance Rc of the switch portion 8 for the current interruption and the on-voltage of the diode 41 are fluctuated or varied, the voltage difference $\Delta V$ between the voltages at the input and output sides of the switch portion 8 can be measured, and thus the voltage difference which is equivalent to the open-circuit voltage of the battery can be detected without being affected by the above elements.

Further, since the voltage at the input side of the switch portion 8 when the charging current is interrupted is equal to the output voltage of the charger under no load, the voltage at the input side can be set to a constant reference voltage even when the charger characteristic is that the output voltage is varied by a load current. Therefore, the termination of the charging can be easily detected, and the detection accuracy of the termination of the charging can be improved. As a result, the charging operation can be simply carried out, and there occurs no dispersion in charging capacity between batteries which have been already charged even when there is difference in contact resistance, etc. therebetween.

Still further, in this embodiment, a voltage difference is detected on the basis of the reference voltage, and this means the detection of the voltage difference through the comparison between the relative values. Therefore, a reference voltage source which is required for the measurement of an absolute-value voltage is not required in this embodiment. For example, the off-set adjustment for the operational amplifier and the reference voltage adjustment for the A/D converter are not required. As a result, the circuit construction can be simplified, the space for the device can be set small, and the cost-down can be promoted.

Third Embodiment

Figure 16:
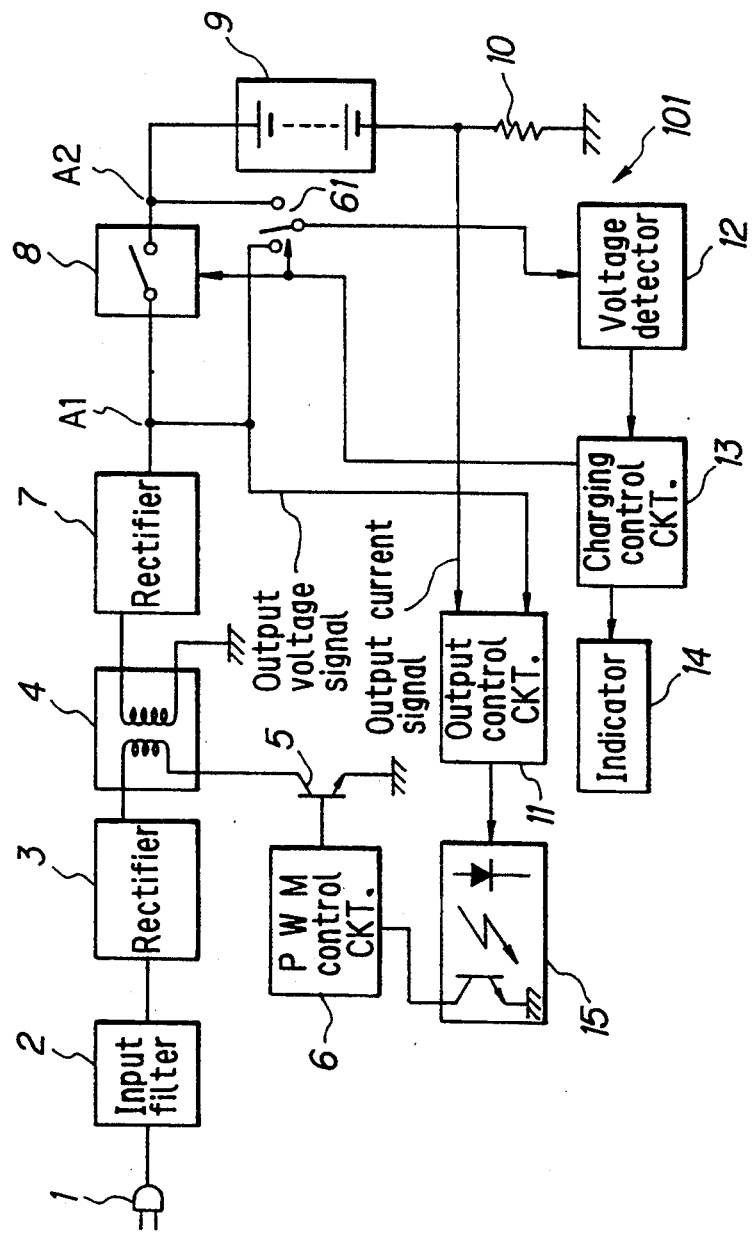
FIG. 16 is a block diagram of a third embodiment of the charging equipment according to this invention.

FIG. 16 is a block diagram of a third embodiment of the charging equipment of this invention. In the following description, the same elements as the first embodiment are represented by the same reference numerals, and the duplicate description thereof is eliminated.

In FIG. 16, a reference numeral 61 represents a selection switch, and the selection switch 61 is so designed to alternately pick up a voltage (hereinafter referred to as "A1-point voltage") at the input side of the switch portion 8 and a voltage (hereinafter referred to as "A2-point voltage") at the output side of the switch portion 8 and output the selected voltage to the voltage detection circuit 12. The selection switch 61 and the voltage detection circuit 12 constitutes voltage detection means 101 in combination.

Figure 17:
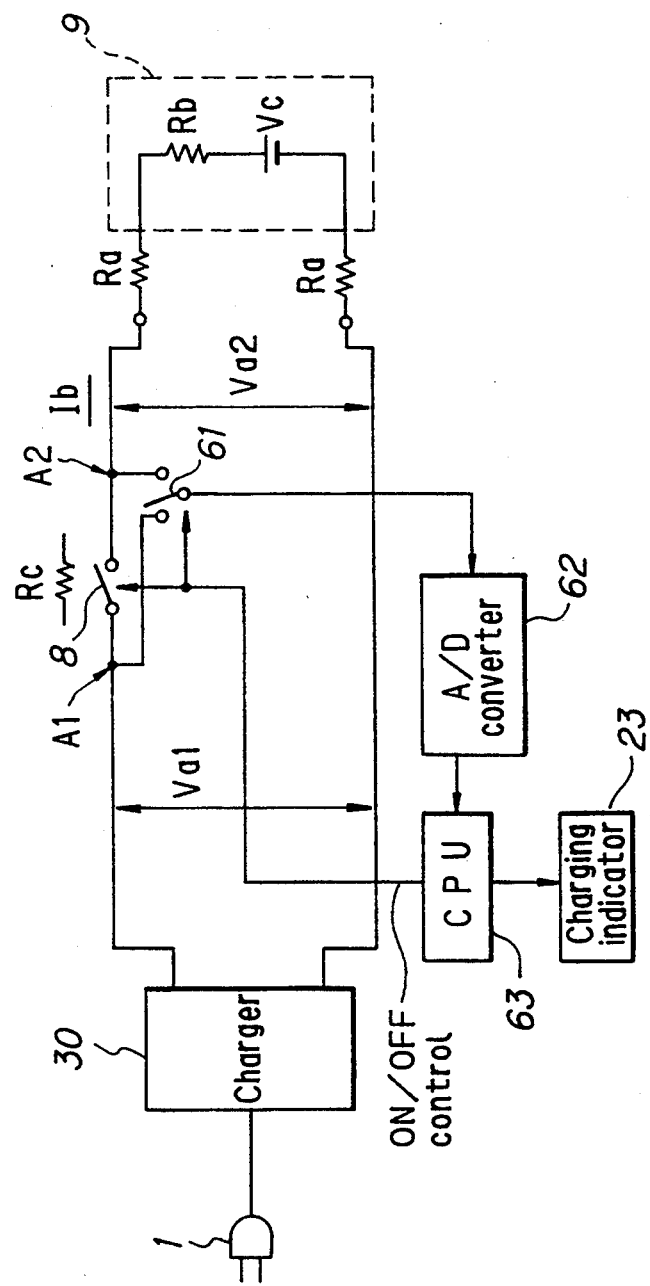
FIG. 17 is a circuit diagram showing the detailed construction of a circuit portion containing a battery voltage detection circuit and a charging control circuit in the third embodiment.

FIG. 17 shows the detailed construction of a circuit portion containing the battery voltage detection circuit 12 and the charging control circuit 13, and shows the main feature of this embodiment. In this embodiment, a CPU is also used. In FIG. 17, one of the voltage (A1-point voltage) at the input side of the switch portion 8 and the voltage (A2-point voltage) at the output side of the switch portion 8 is selected by the selection switch 61, and alternately input to an A/D converter to be subjected to A/D conversion. Thereafter, the A/D converted voltage is output to a CPU 63. The CPU 63 carries out the charging control on the basis of the voltage difference between the A1-point voltage and the A2-point voltage. Unlike the second embodiment, no diode for preventing the reverse flow is provided.

Description of Operation

Figure 18:
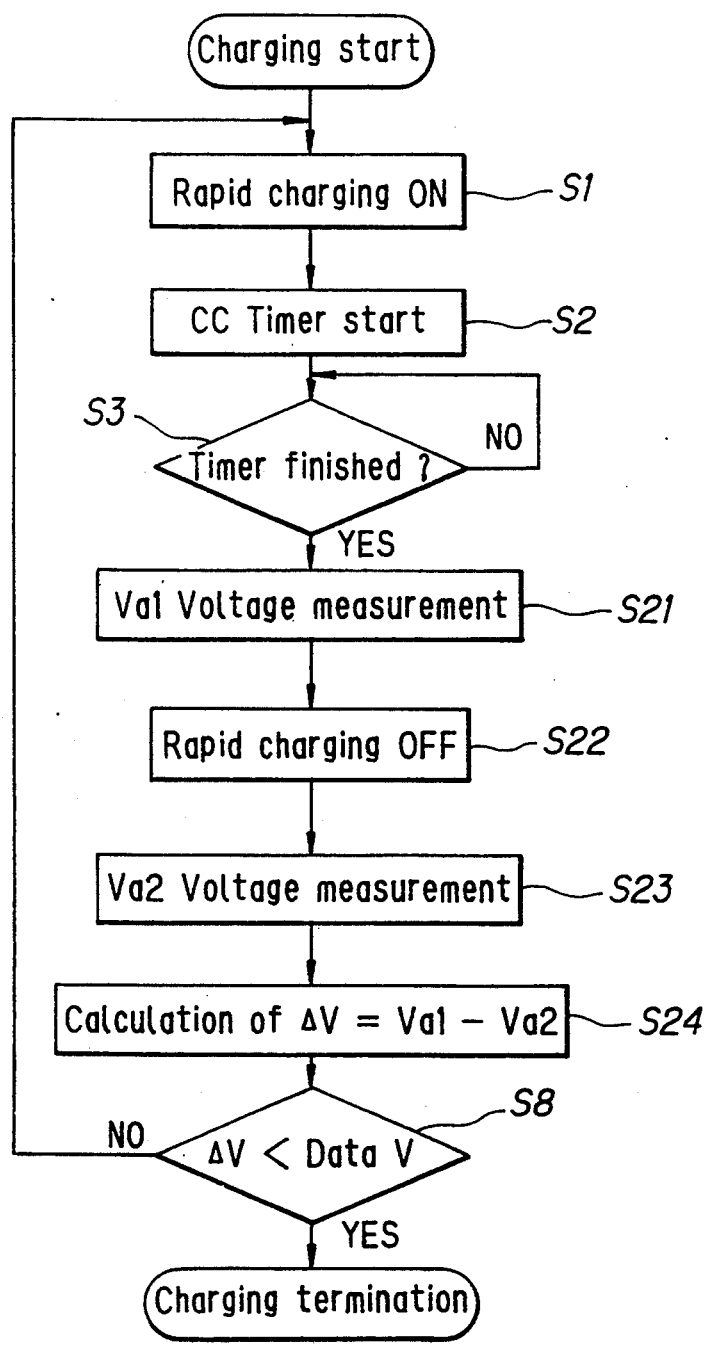
FIG. 18 is a flowchart for a charging control program in the third embodiment.

FIG. 18 is a flowchart for a charge control program which is executed by the CPU 62 to perform the rapid charging in the charging equipment thus constructed.

In the following description for the flowchart, the steps for executing the same processes as the first embodiment are represented by the same step numbers, and the duplicate description thereof is eliminated.

The same processes are carried out until step S3 is reached. Subsequently, at a step S21, the selection switch 61 is switched to the input side of the switch portion 8 to measure the A1-point voltage Va1. Thereafter, at a step S22 the rapid charging is switched off. Subsequently, at a step S23 the selection switch 61 is switched to the output side of the switch portion 8 to measure the A2-point voltage Va2.

Subsequently, at a step S24, the voltage difference $\Delta V$ between the voltages at the input and output sides of the switch portion 8 is calculated in accordance with the following equation:

$$\Delta V = Va1 - Va2$$

Subsequently, the program goes to the step S8 to compare the voltage difference $\Delta V$ with the set voltage value (data V) and detect a point satisfying the inequality: voltage difference $\Delta <$ data V. If it is not satisfied that voltage difference $\Delta <$ data V, the interruption state for the charging termination is released, and the program goes to the step S1 to repeat the same processes and resume the charging for a constant period. This period is counted up by the timer of the CPU 63, and the charging current is interrupted again at the time when the counting of the timer is finished, to measure the voltage difference $\Delta V$ as described above again.

If it is satisfied that voltage difference $\Delta V <$ data V, it is treated as the charge-termination detection point or the full-charging detection display (for example, it is displayed at the outside by the charge display portion 23), and the charging is finished.

The detection of the open-circuit voltage of the battery during the constant-voltage charging period in the charging curve as shown in FIG. 2 will be first considered.

During the constant-voltage charging period, the A1-point voltage (battery-terminal voltage under charging) before the charging current is interrupted is controlled to a fixed voltage by the output control circuit 11 of the charger 30. The fixed voltage can be regarded as a reference voltage. Therefore, the measured value Va1 of the A1-point voltage before interruption of the charging current is a fixed voltage value, and thus Va1=K (fixed voltage value). Accordingly, the above equation can be modified as follows: $\Delta V = K - Va2$.

On the other hand, the measurement of the A2-point voltage Va2 during interruption of the charging current corresponds to the measurement of the open-circuit voltage of the battery, and consequently, the measurement of the voltage difference $\Delta V$ between Va1 and Va2 corresponds to the measurement of the open-circuit voltage of the battery. Therefore, the open-circuit voltage of the battery can be calculated in accordance with the equation: $Va2 = Vc =$ open-circuit voltage of the battery $= K - \Delta V$.

The charging characteristic curve when the charging current is periodically interrupted is similar to that of FIG. 7. The enlarged curve of the X portion of FIG. 7 is similar to that of FIG. 8. As is apparent from FIGS. 7 and 8, the voltage difference $\Delta V$ during the interruption of the charging current is reduced as the battery voltage is increased. Therefore, by calculating the voltage difference $\Delta V$ and estimating the battery voltage on the basis of the calculated voltage difference $\Delta V$, an accurate judgment as to whether the charging is terminated can be made.

The process for detecting the open-circuit voltage of the battery on the basis of the voltage difference $\Delta V$ requires a condition that it is carried out during the constant-voltage charging period when the measured value Va1 of the A1-point voltage before interruption of the charging current becomes the fixed voltage. Therefore, the detection of the open-circuit voltage of the battery during the constant-current charging period when the voltage Va1 is varied as shown in FIG. 7 will be next considered.

As shown in FIG. 7, the voltage difference $\Delta V$ during the constant-current charging period is an extremely larger value than that at the charging-completion detection point of the constant-voltage charging period. This is because the charging current value during the constant-current charging period is larger than the charging current at the charging-termination detection point and thus a voltage drop represented by the equation: $\Delta V = Ib \cdot Rb$ (Ib:charging current, Rb:internal impedance of battery or contact resistance) occurs.

Accordingly, in this embodiment, by setting the set voltage value (data V) to a voltage value smaller than the value of $\Delta V$ occurring during the constant-current charging period, the malfunction can be also avoided even when the charge-termination detection is carried out during the constant-current charging period on the basis of the judgment as to whether the inequality (voltage difference $\Delta V <$ data V) is satisfied.

Next, the reason why the voltage difference $\Delta V$ during the constant-voltage charging period before and after the charging current is interrupted is not affected by the internal impedance of the secondary battery 9, the contact resistance between the battery terminal and the charger, the on-resistance of the selection switch 61, etc. will be described.

Combining the internal impedance Rb of the secondary battery 9, the contact resistances Ra between the battery terminals and the charger and the on-resistance Rc of the switch portion 8, and representing the composite resistance by Tr, $$Rt = Rb + 2 \cdot Ra + Rc$$

The battery-terminal voltage Va1 under charging is represented by the following equations:

$$Va1 = \Delta V + Vb = Ib \cdot Rt + Vc$$

$$Vc = Va1 - Ib \cdot Rt$$

Figure 19:
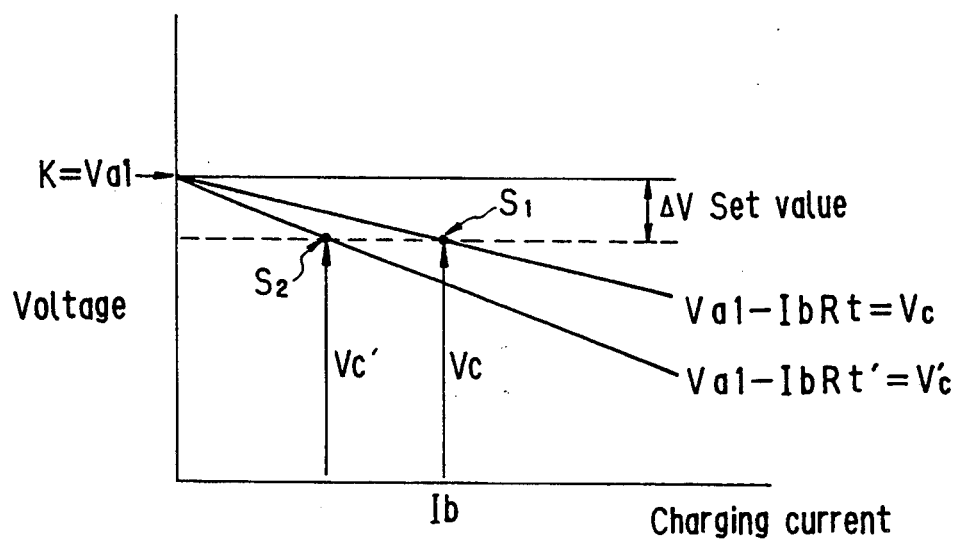
FIG. 19 is a schematic view showing the relationship between the battery terminal voltage and the charging current in the third embodiment.

In this case, the relationship between the battery-terminal voltage and the charging current is shown in FIG. 19. Since the measured value Va1 of the A1-point voltage before the charging current is interrupted is equal to the output control voltage of the charger as described above, it is controlled to be a fixed voltage irrespective of variation of the charging current Ib. Therefore, the above equations can be modified to the following equations:

$$Vc = Va1 - \Delta V$$

$$Vc = Va1 - Ib \cdot Rt$$

$$Vc = K - \Delta V$$

The detection point at this time becomes an S1 point of FIG. 19.

Similarly, considering a case where the value of the above composite resistance Rt is greatly varied (to Rt'), the following equations are also satisfied in this case:

$$Vc' = Va1 - Ib \cdot Rt'$$

$$Vc' = K - \Delta V$$

The detection point at this time becomes an S2 point. Vc' represents an internal voltage of the battery when the composite resistance Rt is greatly varied.

As shown in FIG. 19, only the charging current Ib is varied, and the equation: $Vc = Vc'$ is satisfied, so that the voltage difference $\Delta V$ is detected as an equivoltage.

As described above, even when the internal impedance Rb is varied by altering the battery to be connected to the charger, or the contact resistance Ra between the battery terminal and the charger is varied, the voltage difference $\Delta V$ detection system of this embodiment can detect the voltage difference $\Delta V$ as an equivoltage value.

Further, in the case of the secondary battery having the charging characteristic as shown in FIG. 2, correlation is generally satisfied for the relationship between the open-circuit voltage of the battery and the charging amount. Therefore, the detection can be carried out with a constant charging amount, and thus the termination of the charging and the full-charge display can be performed.

As described above, in the third embodiment, even when the internal impedance Rb of the secondary battery and the contact resistance Ra between the battery terminal and the charger are fluctuated or varied, the voltage difference $\Delta V$ between the voltage at the input side portion 8 before the charging current is interrupted and the voltage at the output side of the switch portion 8 after the charging current is interrupted is measured, and thus the voltage difference = the open-circuit voltage of the battery can be detected without being affected by the above elements.

Therefore, the termination of the charging can be easily detected, and the detection accuracy of the termination of the charging can be improved. As a result, the charging operation can be simply carried out, and there occurs no dispersion in charging capacity between batteries which have been already charged even when there is difference in contact resistance, etc. therebetween.

Further, the secondary battery having the charging characteristic as shown in FIG. 2 generally has correlation between the terminal current and the charging capacity, and thus the charging amount under charging can be also detected by setting the voltage difference as described above to any value.

The voltage before the interruption of the charging current is a constant voltage value during the constant-voltage charging period as shown in the charging curve of FIG. 2. The detection of the voltage difference between this voltage and the voltage after the interruption of the charging current (the open-circuit voltage of the battery) corresponds to the comparison between relative values as a consequence.

Still further, in this embodiment, a voltage difference is detected on the basis of the reference voltage, and thus a reference voltage source which is required for the measurement of an absolute-value voltage is not required in this embodiment. For example, the off-set adjustment for the operational amplifier and the reference voltage adjustment for the A/D converter are not required. As a result, the circuit construction can be simplified, the space for the device can be set small, and the cost-down can be promoted.

As described above, according to this invention, the voltage at the position near to the switching means before interruption of the charging current and the voltage at the input side of the secondary battery are detected to judge whether the voltage difference between these voltages. If the voltage difference is judged to be smaller than the predetermined set voltage, the charging state is judged to be a fully-charging state, and the charging is terminated. That is, by utilizing the phenomenon that as the battery voltage is approached to the output set voltage of the charger during the constant-voltage charging period, the charging current is reduced, and also the voltage difference is reduced, the relation of a constant terminal voltage being equivalent to a charging capacity is detected on the basis of the detection of the above voltage difference, and the charging can be properly terminated.

Accordingly, the termination of the charging can be easily detected, and the detection accuracy for the charging termination can be improved. Further, the charging operation can be simply performed, and no dispersion occurs in charging capacity between batteries which have been already charged, irrespective of difference of the contact resistances thereof.

Further, the voltage difference is detected with the relative values, so that no reference voltage source required for detection of an absolute-value voltage is required, and no absolute-value dispersion adjustment (offset adjustment for operational amplifier and reference voltage adjustment) when a voltage detection circuit is used is required. As a result, the circuit construction can be simplified and miniaturized, and the cost can be reduced.

What is claimed is:

1. A charging equipment for charging a secondary battery, including:
    output control means for controlling a charging operation such that a constant-current charging is carried out for a voltage below a predetermined voltage and a constant-voltage charging is carried out for a voltage above the predetermined voltage;
    switching means for interrupting a charging current from flowing into the secondary battery at a predetermined period;
    charging control means for controlling the operation of said switching means to control the charging;
    voltage detection means for detecting a voltage at a position near to said switching means before a charging current is interrupted and a voltage between said switching means and the secondary battery after the charging current is interrupted, said charging control means controlling the operation of the switching means on the basis of an output of said voltage detection means.

2. The charging equipment as claimed in claim 1, wherein said charging control means includes comparison means for comparing a reference value and a voltage difference between the voltage at the position near to said switching means before the charging current is interrupted and the voltage between said switching means and the secondary battery after the charging current is interrupted, thereby controlling the charging on the basis of a comparison result of said comparison means.

3. The charging equipment as claimed in claim 1, wherein said charging control means includes an analog to digital converter which provides a digital signal corresponding to said output of said voltage detecting, and a digital processor which receives said digital signal from said analog to digital converter.

4. The charging equipment as claimed in claim 1, wherein said voltage detection means includes selection switch means and a voltage detection circuit, said selection switch means selectively connecting the input of said voltage detection circuit to the input of the secondary battery and, prior to interruption of said charging current, to the output of a charging current supply source, to thereby perform a detection operation.

5. The charging equipment as claimed in claim 4, further comprising a power-source terminal for driving an electronic equipment at the output side of said charging current supply source.

6. The charging equipment as claimed in claim 5, further comprising reverse-current flow preventing means disposed between said switching means and a contact point of a charging current supply path to which said power source terminal is connected, said reverse-current flow preventing means serving to prevent the current flow from the secondary battery side to the electronic equipment side.

7. A charging equipment for charging a secondary battery, comprising:
    charging means for supplying a rectified and smoothed charging current;
    interrupting means for selectively interrupting the charging current from passing therethrough to the secondary battery;
    voltage detection means for comparing voltages before and after the interruption of the charging current by said interrupting means to detect a voltage difference between the voltages; and
    charging control means for terminating the charging to the secondary battery when the voltage difference detected by said voltage detection means comprises an A/D converter, and said charging control means comprises a CPU; and
    further comprising selection means for selecting one of the voltages before and after the interruption of the charging current and outputting the selected voltage to said voltage detection means.

8. The charging equipment as claimed in claim 7, wherein said voltage detection means comprises an A/D converter, and said charging control means comprises a CPU.

9. The charging equipment as claimed in claim 7, wherein the voltages before and after the interruption of the charging current correspond to voltages at the input and output sides of said interrupting means, respectively.

10. A charging method for charging a secondary battery, comprising the steps of:
    converting an alternating current to a rectified and smoothed charging current;
    selectively interrupting the rectified and smoothed charging current from flowing into the secondary battery;
    detecting voltages before and after the interruption of the charging current to detect a voltage difference between the voltages;

comparing the voltage difference with a predetermined value; and
terminating the charging to the secondary battery when the voltage difference is below the predetermined value.

11. The charging method as claimed in claim 10, wherein said interrupting step includes a step of interrupting the rectified and smoothed charging current at a predetermined period.

* * * * *